June 7, 1960  W. NICHOLAS  2,939,526
PROJECTION SCREEN
Filed Aug. 27, 1957  3 Sheets-Sheet 1
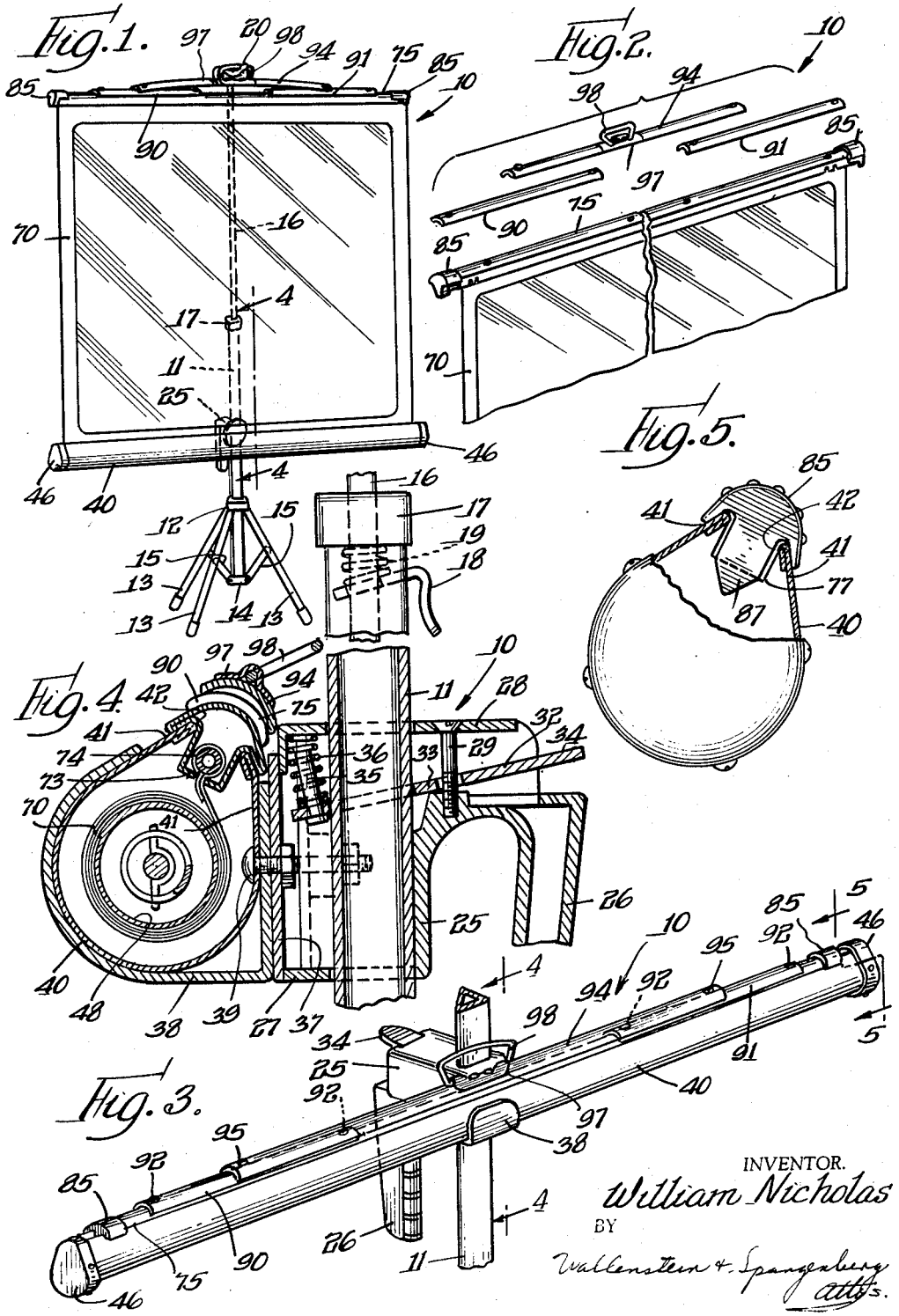
INVENTOR.
William Nicholas
BY
Wallenstein & Spangenberg
attys.

June 7, 1960 W. NICHOLAS 2,939,526
PROJECTION SCREEN
Filed Aug. 27, 1957 3 Sheets-Sheet 2
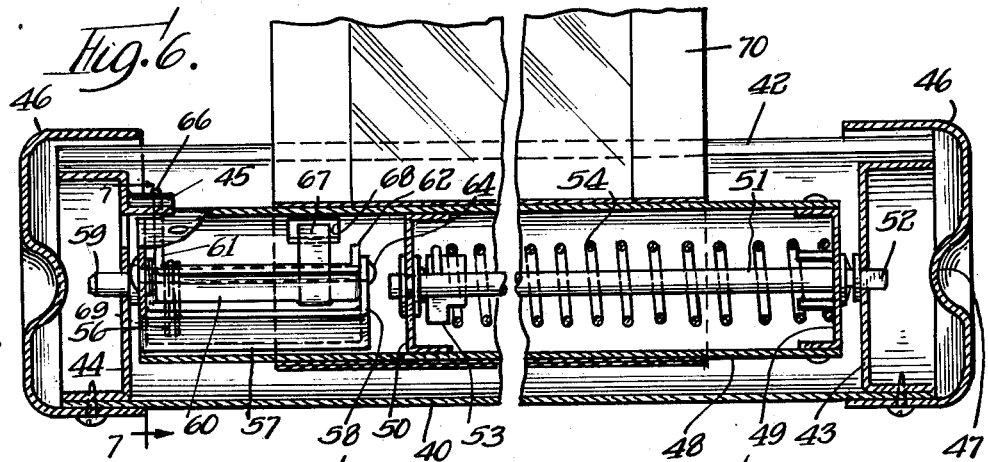
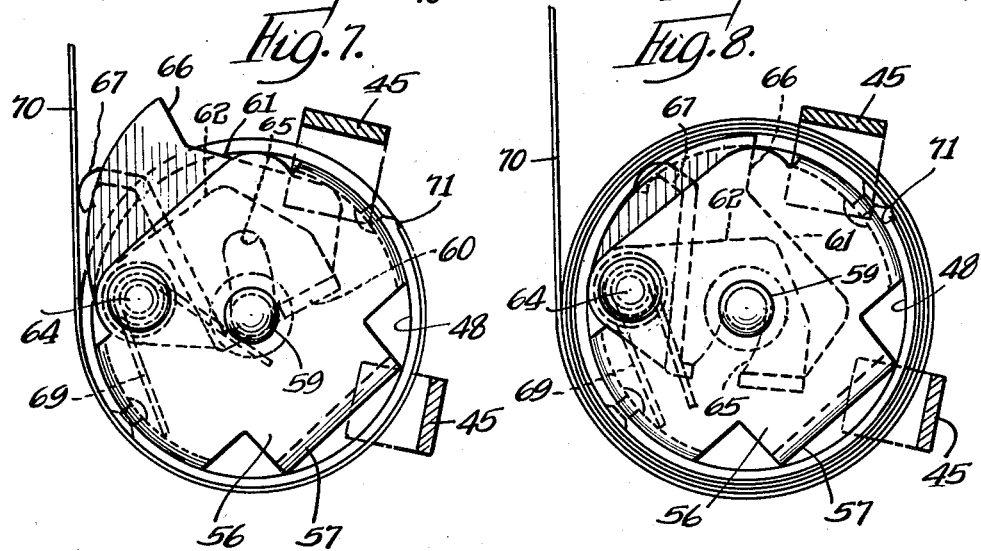
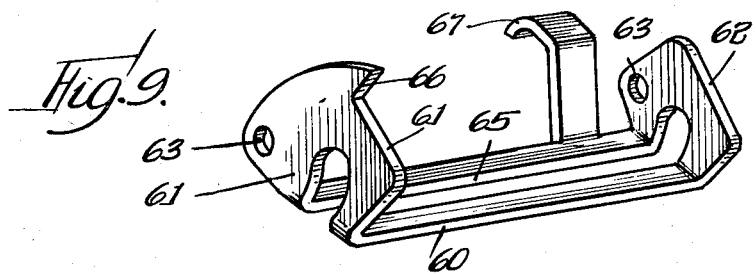
INVENTOR.
William Nicholas
BY
Wallerstein + Spangenberg
attys June 7, 1960
W. NICHOLAS
2,939,526
PROJECTION SCREEN
Filed Aug. 27, 1957
3 Sheets-Sheet 3
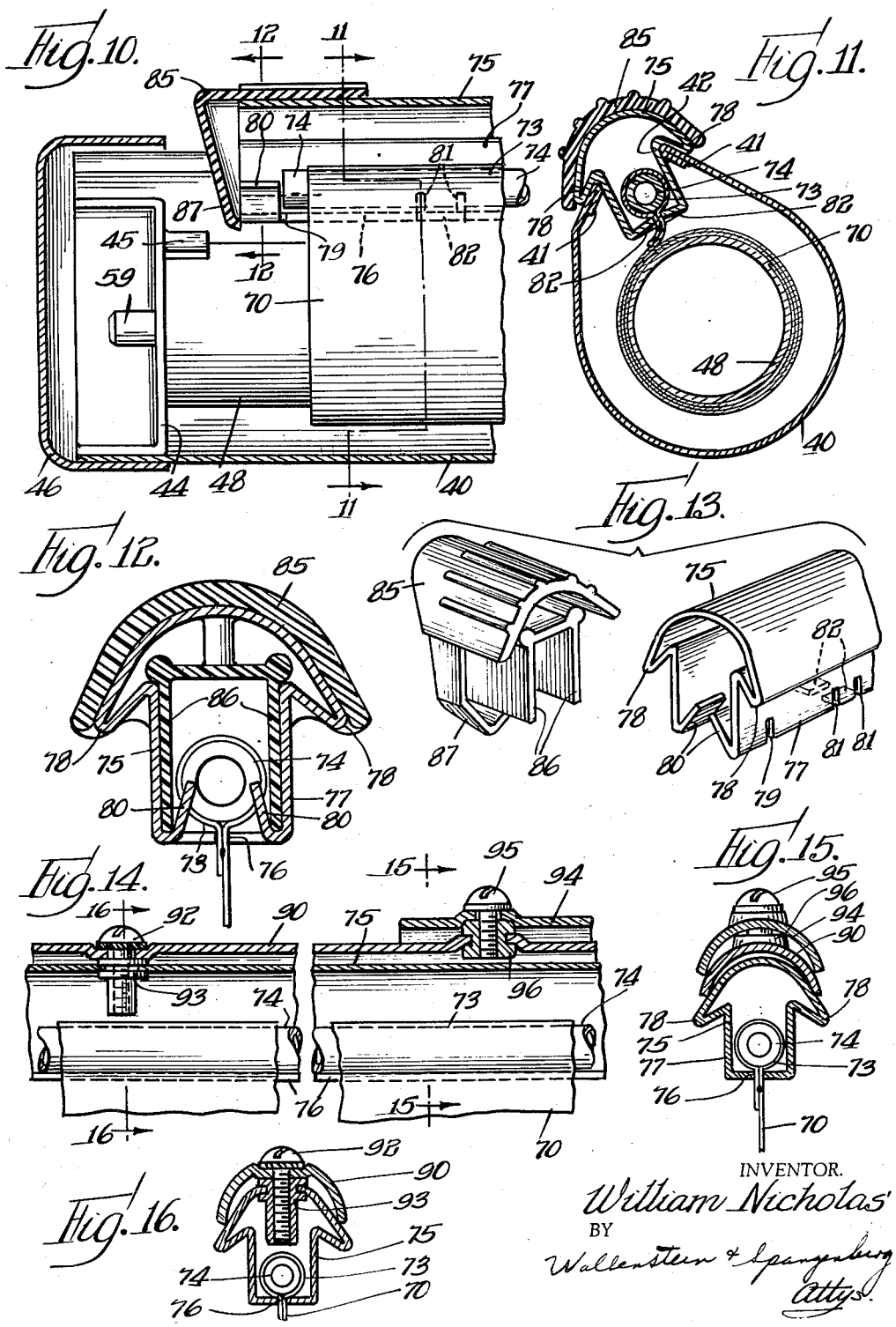
INVENTOR.
William Nicholas
BY
Wallenstein & Spangenberg
attys.

United States Patent Office 2,939,526
Patented June 7, 1960

2,939,526

PROJECTION SCREEN

William Nicholas, Evanston, Ill., assignor to Radiant Manufacturing Corporation, Chicago, Ill., a corporation of Illinois Filed Aug. 27, 1957, Ser. No. 680,510

10 Claims. (Cl. 160—24)

This invention relates to projection screens for use in exhibiting pictures projected thereon.

The principal object of this invention is to provide an improved projection screen having an improved suspension slat construction and an improved resilient means for applying tension to the flexible screen for maintaining the flexible screen flat when it is in picture exhibiting position. The improved suspension slat, which is utilized for unrolling the flexible screen from the roller to picture exhibiting position, is strong and rugged in construction, is firmly secured to the flexible screen in an effective but yet inexpensive manner, is adjustable to prevent formation of wrinkles in the extended flexible screen, interiorly contains the outer end of the flexible screen to prevent damage thereto, encloses and hides the flexible screen in the screen case when the flexible screen is rolled upon the roller, and enhances the appearance of the projection screen. The resilient means for tensioning the flexible screen in picture exhibiting position is a leaf spring whiffle tree construction secured to the suspension slat for applying the tensioning force to the suspension slat at points spaced therealong which also effectively operates to prevent the formation of wrinkles in the extended flexible screen.

Further objects of this invention reside in the details of construction of the improved projection screen and in the cooperative relationships between the component parts thereof.

Other objects and advantages of this invention will become apparent to those skilled in the art upon reference to the accompanying specification, claims and drawings, in which:

Fig. 1 is a perspective view of the improved projection screen of this invention with the screen case horizontally arranged and with the flexible screen extended to picture exhibiting position.

Fig. 2 is an exploded perspective view of the upper portion of the projection screen illustrated in Fig. 1.

Fig. 3 is a perspective view of a portion of the projection screen illustrated in Fig. 1 but showing the flexible screen retracted into the screen case.

Fig. 4 is an enlarged vertical sectional view taken substantially along the lines 4—4 of Fig. 1 and 4—4 of Fig. 3.

Fig. 5 is an elevational view partly in section of the end of the screen case and taken substantially along the line 5—5 of Fig. 3.

Fig. 6 is a vertical sectional view through the screen case.

Fig. 7 is a vertical sectional view taken substantially along the line 7—7 of Fig. 6.

Fig. 8 is a vertical sectional view similar to Fig. 7 but showing the parts in a different position.

Fig. 9 is a perspective view of the locking member illustrated in Figs. 6, 7 and 8.

Fig. 10 is a vertical sectional view through the left hand portion of the screen case with the flexible screen retracted into the screen case.

Fig. 11 is a vertical sectional view taken substantially along the line 11—11 of Fig. 10.

Fig. 12 is a vertical sectional view taken substantially along the line 12—12 of Fig. 10.

Fig. 13 is an exploded perspective view showing the relationship between the suspension slat and the end cap therefor.

Fig. 14 is a vertical sectional view showing the relation between the suspension slat and the resilient means secured thereto.

Fig. 15 is a vertical sectional view taken substantially along the line 15—15 of Fig. 14.

Fig. 16 is a vertical sectional view taken substantially along the line 16—16 of Fig. 14.

Referring first to Figs. 1 to 4, the projection screen of this invention is generally designated at 10. It includes a portable collapsible stand having an upright tube or post 11, which is preferably non-circular in cross section. A bracket 12 is slidably carried on the upright tube 11 and a plurality of legs 13 are pivotally secured to the bracket 12. Fixed to the bottom of the upright tube 11 is a bracket 14 and links 15 are pivotally secured to the bracket 14 and to the legs 13. The legs 13 may be folded together for transportation purposes and when this is done, the bracket 12 slides upwardly on the tube or post 11. Suitable latch means (not shown) may be provided for holding the legs 13 in collapsed position. When the legs are extended for exhibiting purposes, as illustrated in Fig. 1, the bracket 12 slides downwardly on the upright post 11. In this way the supporting stand is maintained in an upright position.

An extension rod 16 is slidably mounted in the upright tube or post 11, the extension rod being guided for vertical movement by a collar (not shown) carried on the lower end of the extension rod and by a cap 17 carried on the upper end of post 11. The extension rod 16 is maintained in any desired extended position by a nipping lever 18 extending through a suitable opening in the upright tube 11 and gripping the extension rod 16. The nipping lever is resiliently urged into gripping position by means of a spring 19 and the action of the spring may be overcome by manually manipulating the nipping lever 18 to allow the desired adjustment of the position of the extension rod 16. The upper end of the extension rod 16 is provided with a hook portion 20. There is thus provided a hook member which is slidably and adjustably carried by the post.

A hollow handle member 25 having a handle portion 26 and a circular portion 27 is slidably carried on the upright tube or post 11, it being provided with a suitable opening for receiving the post 11. The handle member 25 is also provided with a cover 28 which is also provided with an opening for receiving the post 11. The cover 28 is secured to the handle member 25 by a screw 29 threaded into a boss 33 having a shoulder. Located within the hollow handle member 25 is a nipping lever 32 having an opening conforming to and receiving the post 11. This nipping lever is also provided with a hole for accommodating the screw 29 and it is provided at one end with an extension 34 forming a manipulating finger which extends outwardly from the hollow handle member 25. The other end of the nipping lever 32 is provided with a spring seat 35 in the form of a post. The nipping lever 32 is fulcrumed on one side on the shoulder 33 of the hollow handle member 25. Around the post 35 and extending between the cover 28 and the other side of the nipping lever 32 is a compression spring 36. This compression spring 36 operates to tilt the nipping lever 32 about the fulcrum 33 to cause the edges of the opening in the nipping lever to engage and grip the opposite sides of the post 11. In this position the nipping lever forcibly engages the post 11 and prevents relative motion therebetween in either direction. Movement of the handle member 25 upwardly with respect to the post 11 is prevented by the shoulder 33 engaging the nipping lever 32. It is noted that the post 35 extends in close proximity to the cover 28 and the post 35 and the cover 28 operate as a stop means. When the handle member 25 is pushed downwardly, the post 35 engages the cover member 28 and prevents further downward movement of the handle member 25. Thus, with the nipping lever 32 in the position shown in Fig. 4 upward and downward movement of the handle member 25 with respect to the post 11 is prevented. When, however, the extension finger 34 of the nipping lever 32 is pressed downwardly, the nipping lever is fulcrumed about the shoulder 33 to release the edges of the opening therein from the post 11. When this is done, the handle member 25 may be freely moved upwardly and downwardly along the post 11 to any desired position. When the nipping lever 32 is released, it automatically grips the post 11 and locks the handle member 25 in the adjusted position on the post 11.

A circular plate 37 is secured to the circular portion 27 of the handle member 25. A bracket 38 having a flat leg is pivotally mounted on the plate 37 as indicated at 39. This bracket 38 is also provided with a curved leg to which is secured, as by spot welding, a screen case 40. The screen case 40 has an upwardly and rearwardly projecting portion 41 which in turn is provided with a screen accommodating opening 42. The screen case is provided at its ends with brackets 43 and 44, the bracket 44 being provided with a pair of inwardly extending projections 45. The ends of the screen case 40 are closed by a pair of end caps 46. The end cap 46 is provided with a recess 47 which is adapted to receive the hook portion 20 when the screen case is arranged in vertical position parallel to the post 11. In this way the screen case may be locked parallel to the post 11 for transportation and storage purposes. As shown in Fig. 1 the screen case 40 may be swung from its vertical position to horizontal position, this being afforded by the pivotal connection between the screen case and the handle member 25.

Located within the screen case 40 is a spring actuated roller 48, the roller preferably taking the form of a metallic tube. The roller 48 is provided at one end with a spider 49 and intermediate its ends with a spider 50. The spiders 49 and 50 rotatably carry a shaft 51, the outer end of the shaft 51 being flattened as indicated at 52 and being received in a correspondingly shaped hole in the bracket 43. Thus the shaft 51 is supported by the bracket 43 and is also held against rotation. A clip 53 is secured to the shaft 51 adjacent the spider 50. One end of a coil spring 54 is connected to the clip 53 and the other end thereof is connected to the spider 49. The coil spring 54 operates automatically to rotate the roller 48 in a rolling direction, in a counter-clockwise direction as illustrated in Figs. 7 and 8.

The other end of the roller 48 is interiorly provided with a U-shaped bracket 57 having legs 56 and 58. The legs 56 and 58 carry a shaft 59 which extends through an opening in the bracket 44. In this way this end of the roller 48 is mounted for rotation by the bracket 44. Arranged within the U-shaped bracket 57 is a U-shaped bracket 60 having legs 61 and 62. This bracket 60 is provided with holes 63 which in turn receive a pin 64 carried by the U-shaped bracket 57. In this way bracket 60 is pivotally mounted in bracket 57. The bracket 60 is provided with a slot 65 for clearing the shaft 59. The leg 61 of the bracket 60 is provided with a stop shoulder 66 which is adapted to engage the projections 45 on the bracket 44 when the bracket 60 pivots outwardly. The bracket 60 is also provided with a finger 67 which is adapted to extend through a hole 68 in the roller 48 to be engaged by and controlled by the flexible screen carried by the roller. A spring 69 arranged around the pin 64 operates normally to extend the bracket 60 outwardly to the position shown in Fig. 7 where the finger 67 projects outwardly through the hole 68 in the roller and wherein the stop surface 66 is adapted to engage the projection 45.

A flexible screen 70 is secured at its inner end to the roller 48 as by suitable adhesive or the like. Preferably the roller 48 is provided with a longitudinal shoulder 71 against which the inner end of the projection screen 70 abuts. The flexible screen 70 may be provided with any suitable picture projecting surface such as a beaded surface where motion pictures are to be exhibited, or an aluminum type surface where color pictures are to be exhibited. As expressed above, the spring 54 operates automatically to roll the screen on to the roller 48. When the flexible screen 70 is rolled upon the roller 48, the finger 67 of the bracket 60 is engaged by the flexible screen to move the bracket 60 to a retracted position as illustrated in Fig. 8 for the purpose of moving the stop shoulder 66 out of alignment with the projections 45. Thus, the screen 70 may be freely unrolled from the roller 48. When, however, the flexible screen is unrolled to the last turn, the finger 67 is released to allow the spring 69 to advance the bracket 60 to a position where the stop shoulder 66 is moved outwardly into alignment with the projections 45 as shown in Fig. 7. When the stop shoulder 66 engages the projection 45, further unrolling of the flexible screen 70 from the roller 48 is positively prevented. As a result, tearing and separation of the screen from the roller is prevented and tensioning of the screen is permitted.

The outer end of the flexible screen 70 is looped and seamed as indicated at 73, around a retaining member 74 which preferably takes the form of a rod or the like. The outer end of the flexible screen and the retaining member are internally received within a tubular member 75 provided throughout its length with a slot 76. In this connection the outer end of the screen and the retaining member 74 are longitudinally inserted into the tubular member 75 from one end thereof, the flexible screen extending through the slot 76. The tubular member 75 which may be formed of metal or the like, is provided with a projecting portion 77 which is adapted to be received in the screen accommodating opening 42 in the screen case 40 for closing that opening when the flexible screen 70 is retracted into the screen case 40. Toward this same end the tubular member 75 is also provided with flange portions 78 which overlie the upwardly and rearwardly extending portion 41 of the screen case 40 adjacent the screen accommodating opening 42. The tubular member 75 is provided at each end with notches 79 adjacent the slot 76 to form tabs 80. After the retaining member 74 is inserted in the tubular member 75 the tabs 80 are bent inwardly so as to engage the ends of the retaining member 74 to prevent longitudinal displacement thereof with respect to the tubular member 75. The tubular member 75 is also provided at points along its length with notches 81 forming fingers 82. These fingers 82 may be bent inwardly desired amounts for the purpose of adjustably positioning the retaining member 74 with respect to the tubular member 75 for the purpose of preventing the formation of wrinkles in the flexible screen when the flexible screen is extended to picture exhibiting position. Thus, it is seen that the retaining member 74 and the tubular member 75 form a suspension slat construction which is strong and rugged, which is firmly secured to the flexible screen in an effective but yet inexpensive manner, which is adjustable to prevent formation of wrinkles in the extended flexible screen, which interiorly contains the outer end of the flexible screen to prevent damage thereto, which encloses and hides the flexible screen in the screen case when the flexible screen is rolled upon the roller, and which enhances the appearance of the projection screen.

Each end of the tubular member 75 is provided with an end cap 85 which is preferably formed of synthetic plastic or the like. The end cap 85 is pressed fit on to the end of the tubular member 75 and is provided with a channel section 86 which is received within the projecting portion 77 of the tubular member 75 as illustrated more clearly in Figs. 12 and 13. The tabs 80 which operate to prevent longitudinal displacement of the retaining member 74 also operate to retain the end cap 85 in position on the tubular member 75. The end cap 85 is also provided with a downwardly extending cam portion 87 which operates to guide the projecting portion 77 of the tubular member 75 into the screen accommodating opening 42 in the screen case 40 when the flexible screen 70 is retracted into the screen case 40. Thus, the end caps 85 in addition to enhancing the appearance of the projection screen also operate to guide the tubular member 75 of the suspension slat with respect to the screen accommodating opening 42 in the screen case 40.

Resilient means are provided for the purpose of tensioning the flexible screen when the flexible screen has been extended to picture exhibiting position and this resilient means is more clearly illustrated in Figs. 1 to 3 and 14 to 16. This resilient means is in the form of a leaf spring whiffle tree arrangement which is secured to the tubular member 75 forming the suspension slat. Here a pair of leaf spring members 90 and 91 are secured at their ends to the tubular member 75 by means of screws 92 and nuts 93. The screws 92 are arranged at substantially equally spaced points along the tubular member 75 and the tensioning force provided by the resilient means is applied at these points. Since these points are substantially equally spaced along the tubular member 75, the tensioning force is uniformly applied thereto with minimum tendency to distort the tubular member 75. A third leaf spring member 94 is secured at its ends to the centers of the pair of leaf spring members 90 and 91 by means of screws 95 and nuts 96. The center of the third leaf spring member 94 carries a bracket 97 upon which is secured a bail 98. The bail 98 operates as a handle for withdrawing the flexible screen 70 from the screen case 40 and for holding the flexible screen in picture exhibiting position when the bail 98 is placed over the hook member 20 as illustrated in Fig. 1. The leaf spring members forming the resilient means operate to provide a greater tensioning force for the flexible screen 70 than can be provided by the spring 54 of the spring actuated roller 48.

When the flexible screen is extended to picture exhibiting position and the bail 98 is placed over the hook member 20, as illustrated in Fig. 1, the stop means illustrated in Figs. 6 to 9 operate to prevent further rotation of the spring actuated roller 48 in unrolling direction, the roller 48 thus being locked. When the hook member 20 and the handle member 25 are thereafter moved apart and locked in such position, the leaf spring members 90, 91, and 94 of the resilient means are stressed to provide a tensioning force to the flexible screen 70. This tensioning force is appreciably greater than the tensioning force that could be applied by the spring actuated roller and consequently an appreciable amount of tension is applied to the flexible screen 70. Because this tensioning force is applied uniformly along the suspension slat by reason of the leaf spring whiffle tree construction, the flexible screen is uniformly tensioned and the formation of wrinkles therein is effectively prevented.

While for purposes of illustration one form of this invention has been disclosed, other forms thereof may become apparent to those skilled in the art upon reference to this disclosure and, therefore, this invention should be limited only by the scope of the appended claims.

I claim as my invention:

1. In a projection screen for exhibiting pictures projected thereon and having a supporting stand, a screen case carried by the supporting stand, a spring actuated roller mounted in the screen case, a flexible screen secured at its inner end to the roller and being automatically rollable thereon, and a hook member carried by the supporting stand, the improvement comprising, a retaining member secured to the outer end of the screen and extending throughout the length thereof, a tubular member having a slot therein for accommodating the screen and being of less width than the width of the retaining member, the outer end of the screen and the retaining member being received within the tubular member and engaging the tubular member adjacent the slot to be retained thereby with the screen extending through the slot, the tubular member forming a suspension slat for the screen for unrolling the screen from the roller, and means carried by the tubular member and including a bail adapted to be received over the hook member for securing the screen in picture exhibiting position, said tubular member being notched at points along its length adjacent the slot to form adjustable fingers for adjusting the retaining member with respect to the tubular member.

2. In a projection screen for exhibiting pictures projected thereon and having a supporting stand, a screen case carried by the supporting stand, a spring actuated roller mounted in the screen case, a flexible screen secured at its inner end of the roller and being automatically rollable thereon, and a hook member carried by the supporting stand, the improvement comprising, a loop formed on the outer end of the screen, a rod extending throughout the length of the loop and forming a retaining member for the outer end of the screen, a tubular member having a slot therein for accommodating the screen and being of less width than the width of the retaining member, the outer end of the screen and the retaining member being received within the tubular member and engaging the tubular member adjacent the slot to be retained thereby with the screen extending through the slot, the tubular member forming a suspension slat for the screen for unrolling the screen from the roller, and means carried by the tubular member and including a bail adapted to be received over the hook member for securing the screen in picture exhibiting position, said tubular member being notched at points along its length adjacent the slot to form adjustable fingers for adjusting the retaining member with respect to the tubular member.

3. In a projection screen for exhibiting pictures projected thereon and having a supporting stand, a screen case carried by the supporting stand, a spring actuated roller mounted in the screen case, a flexible screen secured at its inner end to the roller and being automatically rollable thereon, and a hook member carried by the supporting stand, the improvement comprising, a retaining member secured to the outer end of the screen and extending throughout the length thereof, a tubular member having a slot therein for accommodating the screen and being of less width than the width of the retaining member, the outer end of the screen and the retaining member being received within the tubular member and engaging the tubular member adjacent the slot to be retained thereby with the screen extending through the slot, the tubular member forming a suspension slat for the screen for unrolling the screen from the roller, means for releasably securing the suspension slat to the hook member for holding the screen in picture exhibiting position and including resilient means connected to the tubular member for applying a greater tensioning force to the screen than can be applied by the spring actuated roller, and means for tensioning the screen in picture exhibiting position including means for locking the roller against rotation in the unrolling direction to allow the resilient means to tension the screen, said tubular member being notched at points along its length adjacent the slot to form adjustable fingers for adjusting the retaining member with respect to the tubular member.

4. In a projection screen for exhibiting pictures projected thereon and having a supporting stand, a screen case carried by the supporting stand, a spring actuated roller mounted in the screen case, a flexible screen secured at its inner end to the roller and being automatically rollable thereon, a suspension slat secured to the outer end of the screen, and a hook member carried by the supporting stand, the improvement comprising, means for releasably securing the suspension slat to the hook member in picture exhibiting position when the screen is unrolled from the roller and including resilient means for applying a greater tensioning force to the screen than can be applied by the spring actuated roller, said resilient means including a pair of leaf spring members secured at their ends at points along the length of the suspension slat, a third leaf spring member secured at its ends to the centers of the pair of leaf spring members and a bail secured to the center of the third leaf spring member and adapted to be releasably secured to the hook member, and means for tensioning the screen in picture exhibiting position including means for locking the roller against rotation in the unrolling direction to allow the resilient means to tension the screen.

5. In a projection screen for exhibiting pictures projected thereon and having a supporting stand, a screen case carried by the supporting stand, a spring actuated roller mounted in the screen case, a flexible screen secured at its inner end to the roller and being automatically rollable thereon, and a hook member carried by the supporting stand, the improvement comprising, a retaining member secured to the outer end of the screen and extending throughout the length thereof, a tubular member having a slot therein for accommodating the screen and being of less width than the width of the retaining member, the outer end of the screen and the retaining member being received within the tubular member and engaging the tubular member adjacent the slot to be retained thereby with the screen extending through the slot, the tubular member forming a suspension slat for the screen for unrolling the screen from the roller, means for releasably securing the suspension slat to the hook member for holding the screen in picture exhibiting position and including resilient means connected to the tubular member for applying a greater tensioning force to the screen than can be applied by the spring actuated roller, said resilient means including a pair of leaf spring members secured at their ends at points along the length of the tubular member, a third leaf spring member secured at its ends to the center of the pair of leaf spring member and a bail secured to the center of the third leaf spring member and adapted to be releasably secured to the hook member, and means for tensioning the screen in picture exhibiting position including means for locking the roller against rotation in the unrolling direction to allow the resilient means to tension the screen.

6. In a projection screen for exhibiting pictures projected thereon and having a supporting stand, a screen case carried by the supporting stand, a spring actuated roller mounted in the screen case, a flexible screen secured at its inner end to the roller and being automatically rollable thereon, and a hook member carried by the supporting stand, the improvement comprising, a retaining member secured to the outer end of the screen and extending throughout the length thereof, a tubular member having a slot therein for accommodating the screen and being of less width than the width of the retaining member, the outer end of the screen and the retaining member being received within the tubular member and engaging the tubular member adjacent the slot to be retained thereby with the screen extending through the slot, the tubular member forming a suspension slat for the screen for unrolling the screen from the roller, means for releasably securing the suspension slat to the hook member for holding the screen in picture exhibiting position and including resilient means connected to the tubular member for applying a greater tensioning force to the screen than be applied by the spring actuated roller, said resilient means including a pair of leaf spring members secured at their ends at points along the length of the tubular member, a third leaf spring member secured at its ends to the center of the pair of leaf spring members and a bail secured to the center of the third leaf spring member and adapted to be releasably secured to the hook member, and means for tensioning the screen in picture exhibiting position including means for locking the roller against rotation in the unrolling direction to allow the resilient means to tension the screen, said tubular member being notched at points along its length adjacent the slot to form adjustable fingers for adjusting the retaining member with respect to the tubular member.

7. In a projection screen for exhibiting pictures projected thereon, a screen case having upwardly and rearwardly extending wall portions terminating in an upwardly and rearwardly projected screen accommodating opening extending throughout the length of the screen case, a spring actuated roller mounted in the screen case, a flexible screen secured at its inner end to the roller and being automatically rollable thereon and extending through the screen accommodating opening, a retaining member secured to the outer end of the screen and extending throughout the length thereof, a tubular member having a slot therein for accommodating the screen and being of less width than the width of the retaining member, the outer end of the screen and the retaining member being received within the tubular member and engaging the tubular member adjacent the slot to be retained thereby with the screen extending through the slot, said tubular member being provided throughout its length with a substantially rectangular downwardly projecting portion which is received within the screen accommodating opening and a pair of downwardly and outwardly extending flange portions which overlie the upwardly and rearwardly extending wall portions of the screen case when the screen accommodating opening in the screen case when the screen is rolled upon the roller, said tubular member also forming a suspension slat for the screen for unrolling the screen from the roller to picture exhibiting position.

8. In a projection screen for exhibiting pictures projected thereon, a screen case having upwardly and rearwardly extending wall portions terminating in an upwardly and rearwardly projected screen accommodating opening extending throughout the length of the screen case, a spring actuated roller mounted in the screen case, a flexible screen secured at its inner end to the roller and being automatically rollable thereon and extending through the screen accommodating opening, a retaining member secured to the outer end of the screen and extending throughout the length thereof, a tubular member having a slot therein for accommodating the screen and being of less width than the width of the retaining member, the outer end of the screen and the retaining member being received within the tubular member and engaging the tubular member adjacent the slot to be retained thereby with the screen extending through the slot, said tubular member being provided throughout its length with a substantially rectangular downwardly projecting portion which is received within the screen accommodating opening and a pair of downwardly and outwardly extending flange portions which overlie the upwardly and rearwardly extending wall portions of the screen case adjacent the screen accommodating opening in the screen case when the screen is rolled upon the roller, said tubular member also forming a suspension slat for the screen for unrolling the screen from the roller to picture exhibiting position, and an end cap secured to each end of the tubular member and having a cam projection thereon extending downwardly beyond the projecting portion of the tubular member for engaging the screen accommodating opening in the screen case when the screen is rolled upon the roller for guiding the projecting portion of the tubular member into the screen accommodating opening of the screen case.

9. In a projection screen for exhibiting pictures projected thereon, a screen case having a screen accommodating opening extending throughout its length, a spring actuated roller mounted in the screen case, a flexible screen secured at its inner end to the roller and being automatically rollable thereon and extending through the screen accommodating opening, a retaining member secured to the outer end of the screen and extending throughout the length thereof, a tubular member having a slot therein for accommodating the screen and being of less width than the width of the retaining member, the outer end of the screen and the retaining member being received within the tubular member and engaging the tubular member adjacent the slot to be retained thereby with the screen extending through the slot, the tubular member forming a suspension slat for the screen for unrolling the screen from the roller, said tubular member being notched at points near its ends and adjacent the slot to form inwardly extending tabs which engage the ends of the retaining member to prevent longitudinal displacement of the screen and retaining member with respect to the tubular member.

10. In a projection screen for exhibiting pictures projected thereon, a screen case having a screen accommodating opening extending throughout its length, a spring actuated roller mounted in the screen case, a flexible screen secured at its inner end to the roller and being automatically rollable thereon and extending through the screen accommodating opening, a retaining member secured to the outer end of the screen and extending throughout the length thereof, a tubular member having a slot therein for accommodating the screen and being of less width than the width of the retaining member, the outer end of the screen and the retaining member being received within the tubular member and engaging the tubular member adjacent the slot to be retained thereby with the screen extending through the slot, the tubular member forming a suspension slat for the screen for unrolling the screen from the roller, said tubular member being notched at points along its length adjacent the slot to form adjustable fingers for adjusting the retaining member with respect to the tubular member.

References Cited in the file of this patent
UNITED STATES PATENTS

| | | |
|---|---|---|
| 1,371,149 | Dudek | Mar. 8, 1921 |
| 1,901,073 | Bailey | Mar. 14, 1933 |
| 1,918,423 | Persinger | July 18, 1933 |
| 2,696,249 | Prokop et al. | Dec. 7, 1954 |
| 2,832,405 | Cooley et al. | Apr. 29, 1958 |